United States Patent
Cole et al.

(10) Patent No.: US 8,750,675 B2
(45) Date of Patent: Jun. 10, 2014

(54) ACCESSING AND STORING ORIGINAL BROADCAST CONTENT

(71) Applicant: International Business Machines Corporation, Armonk, NY (US)

(72) Inventors: Charles A. Cole, Cary, NC (US); Clark A. Dudek, Raleigh, NC (US); Kobina K. Inkumsah, Lansing, MI (US); Adrian X. Rodriguez, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/623,942

(22) Filed: Sep. 21, 2012

(65) Prior Publication Data

US 2014/0086563 A1    Mar. 27, 2014

(51) Int. Cl.
| | |
|---|---|
| H04N 9/80 | (2006.01) |
| G11B 27/00 | (2006.01) |
| H04N 5/93 | (2006.01) |
| H04N 5/94 | (2006.01) |
| H04N 5/76 | (2006.01) |

(52) U.S. Cl.
USPC .......... 386/239; 386/263; 386/278; 386/291; 386/248; 386/255; 386/259

(58) Field of Classification Search
USPC .......... 386/239, 263, 278, 291, 248, 255, 259
See application file for complete search history.

(56) References Cited

U.S. PATENT DOCUMENTS

| | | | |
|---|---|---|---|
| 7,873,982 B2 | 1/2011 | Smith et al. | |
| 8,099,750 B2 * | 1/2012 | Howarter et al. | 725/33 |
| 2003/0031455 A1 | 2/2003 | Sagar | |
| 2008/0085051 A1 * | 4/2008 | Yoshii et al. | 382/182 |
| 2008/0107404 A1 | 5/2008 | Nakamura et al. | |
| 2010/0061709 A1 | 3/2010 | Agnihotri et al. | |

FOREIGN PATENT DOCUMENTS

| | | |
|---|---|---|
| EP | 0926892 A2 | 6/1999 |
| WO | 2006018790 A1 | 2/2006 |

OTHER PUBLICATIONS

Jen-Hao Yeh, et al.; "TV Commercial Detection in News Program Videos"; 2005 IEEE; pp. 4594-4597.

* cited by examiner

*Primary Examiner* — Daquan Zhao
(74) *Attorney, Agent, or Firm* — Nicholas L. Cadmus

(57) ABSTRACT

In a method for accessing and storing original content without an overlay of interruption content, a computer receives original content with an overlay of interruption content during an interruption period from a content provider. The computer receives a notification that the interruption period is complete. The computer accesses original content without the overlay of interruption content. The computer stores the original content without the overlay of interruption content.

6 Claims, 4 Drawing Sheets

ACCESSING AND STORING ORIGINAL BROADCAST CONTENT

TECHNICAL FIELD

The present invention relates generally to the field of broadcast media and more specifically to a method, system, and computer program product for accessing and storing original broadcast content unavailable during a broadcast interruption.

BACKGROUND

A digital video recorder (DVR) is an electronic device or application software that records broadcast content in a digital format to a disk drive or other local or networked storage devices. Broadcast content is transmitted digitally through cable systems, satellite systems, the Internet, or "over the air" systems to digital tuners which are typically integrated into a DVR. Once the broadcast content from a provider (e.g., a cable system, satellite system, the Internet, or an "over the air" system) reaches the digital tuner and is decrypted (if required by provider), the broadcast content is able to be recorded by the DVR. The DVR saves the broadcast content as a file on a storage device.

Broadcast content can be interrupted by weather alerts, breaking news, or any number of other interruptions. Generally, a provider (e.g., a cable system, satellite system, the Internet, or an "over the air" system) has the capability to insert content or replace part of the broadcast content with content unique to a local broadcast station or system. Commonly, a local news, weather, or traffic report will interrupt the broadcast content so as to keep a viewer from seeing the original broadcast content. In an emergency, such as severe weather, the interruption may occur though the Emergency Alert System.

SUMMARY

Aspects of an embodiment of the present invention disclose a method and a program product for accessing and storing original content without an overlay of interruption content. A computer receives original content with an overlay of interruption content during an interruption period from a content provider. The computer receives a notification that the interruption period is complete. The computer accesses original content without the overlay of interruption content. The computer stores the original content without the overlay of interruption content.

DETAILED DESCRIPTION

Figure 1:
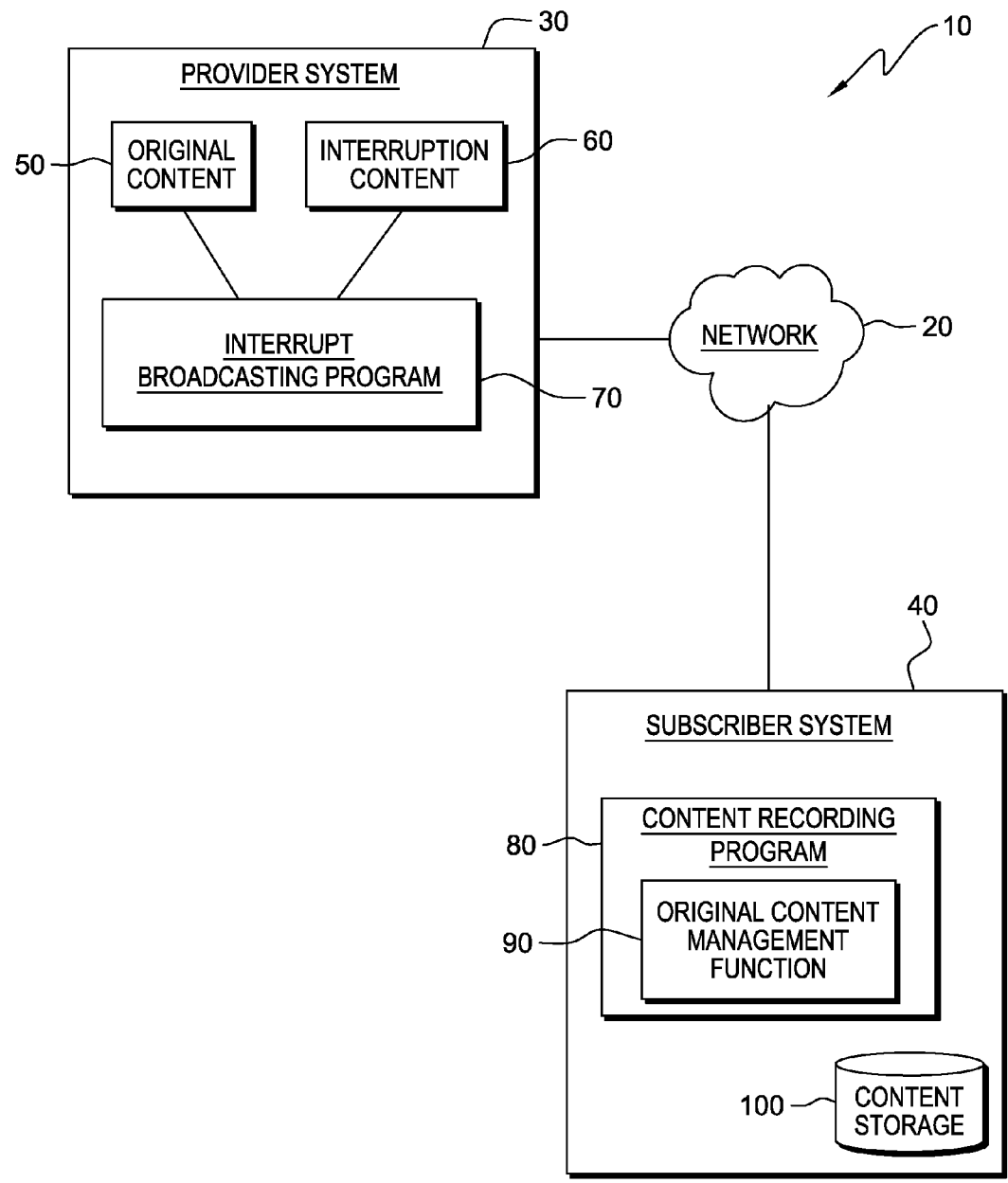
FIG. 1 depicts a diagram of a system in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the figures.

FIG. 1 depicts a diagram of system 10 in accordance with one embodiment of the present invention. FIG. 1 provides only an illustration of one embodiment and does not imply any limitations with regard to the environments in which different embodiments may be implemented.

In the depicted embodiment, system 10 includes provider system 30 and subscriber system 40 interconnected over network 20. Network 20 may be a local area network (LAN), a wide area network (WAN) such as the Internet, a cable television system, a satellite television system, an "over the air" system, any combination thereof, or any combination of connections and protocols that will support communications between provider system 30 and subscriber system 40 in accordance with embodiments of the invention. Network 20 may include wired, wireless, or fiber optic connections. System 10 may include additional systems, computers, or other devices not shown.

Provider system 30 may be a management server, a web server, or any other electronic device or computing system capable of receiving and sending data. In other embodiments, provider system 30 may represent a server computing system utilizing multiple computers as a server system, such as in a cloud computing environment. Provider system 30 contains original content 50, interruption content 60, and interrupt broadcasting program 70.

Subscriber system 40 may be a digital video recorder (DVR) device, desktop computer, laptop computer, or tablet computer. In general, subscriber system 40 may be any electronic device or computing system capable of sending and receiving data, and communicating with provider system 30 over network 20. Subscriber system 40 contains content recording program 80, original content management function 90, and content storage 100.

Figure 4:
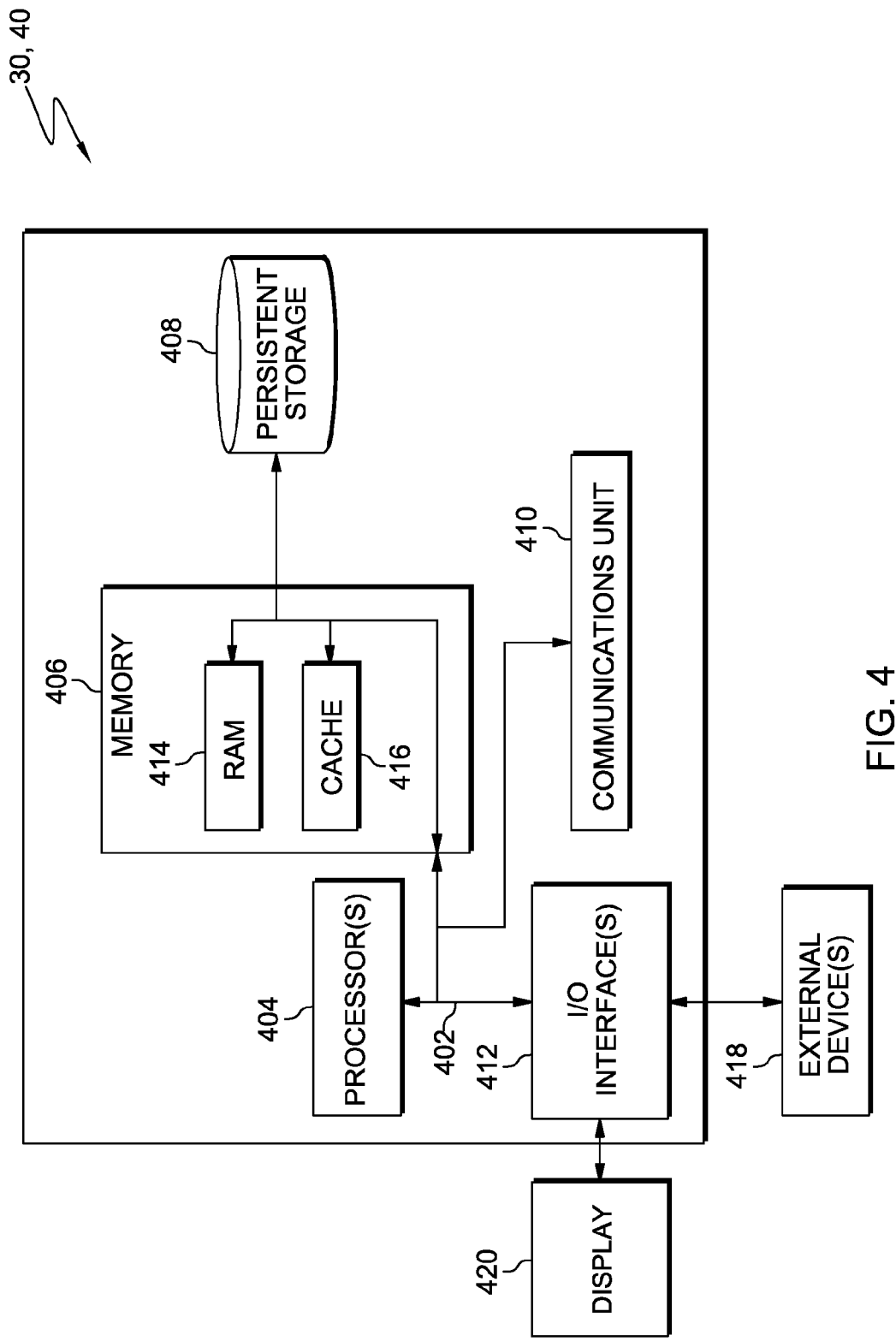
FIG. 4 depicts a block diagram of components of a provider system and a subscriber system of FIG. 1, in accordance with one embodiment of the present invention.

Provider system 30 and subscriber system 40 may each include internal and external components as depicted in further detail with respect to FIG. 4.

Original content 50 is television program content such as a movie, sporting event, or television episode. In general, original content 50 may be any scheduled content intended for distribution to viewers by providers (e.g., a cable system, satellite system, the Internet, or an "over the air" television station). In one embodiment, original content 50 is a file of digital content which includes audio and video data. In another embodiment, original content 50 is streaming data from a live broadcast. In one embodiment, original content 50 is located on provider system 30. In another embodiment, original content 50 may be located on another electronic device or computing system, provided that original content 50 is accessible to interrupt broadcasting program 70.

Interruption content 60 is content such as a weather alert, breaking news, or an Emergency Alert System message. In general, interruption content 60 may be any nonscheduled content that is intended for distribution to viewers at a higher priority than original content 50. In one embodiment, interruption content 60 is a file of digital content which includes audio and video data. In another embodiment, original content 50 is streaming data from a live broadcast. In one embodiment, interruption content 60 is located on provider system 30. In another embodiment, interruption content 60 may be located on another electronic device or computing system, provided that interruption content 60 is accessible to interrupt broadcasting program 70.

Interrupt broadcasting program 70 operates to send interruption content 60 to subscriber system 40 during an interruption period. In one embodiment, interrupt broadcasting program 70 overlays original content 50 with interruption content 60 such that all of interruption content 60 would be visible to a viewer. Interrupt broadcasting program 70 sends original content 50 with an overlay of interruption content 60 to original content management function 90 during the interruption period. In another embodiment, interrupt broadcasting program 70 encrypts original content 50 using a symmetric encryption algorithm (e.g., Advanced Encryption Standard (AES)). Interrupt broadcasting program 70 sends encrypted original content 50 and original content 50 with an overlay of interruption content 60 in parallel to original content management function 90 during the interruption period.

In one embodiment, the interruption period is a period of time when only original content 50 with an overlay of interruption content 60 is available to be viewed by a viewer. Original content 50 without the overlay of interruption content 60 is not available until after the interruption period. When interrupt broadcasting program 70 starts sending original content 50 with an overlay of interruption content 60 to original content management function 90, the interruption period begins. When interrupt broadcasting program 70 stops sending original content 50 with an overlay of interruption content 60 to original content management function 90, the interruption period is complete.

In one embodiment, interrupt broadcasting program 70 resides on provider system 30. In other embodiments, interrupt broadcasting program 70 may reside on another electronic device or computing system, provided that interrupt broadcasting program 70 is able to access original content 50 and interruption content 60, and provided that interrupt broadcasting program 70 can communicate with original content management function 90.

Content recording program 80 operates to manage stored content in content storage 100 for access by a viewer at subscriber system 40. For example, content recording program 80 may be a known DVR program. In one embodiment, content recording program 80 resides on subscriber system 40. In other embodiments, content recording program 80 may reside on another electronic device or computing system, provided that content recording program 80 has access to content storage 100.

Original content management function 90 operates to access and store original content 50 without an overlay of interruption content 60. In one embodiment, original content management function 90 receives original content 50 with an overlay of interruption content 60 during an interruption period. Original content management function 90 receives a notification that the interruption period is complete. Original content management function 90 accesses original content 50 without the overlay of interruption content 60. Original content management function 90 stores original content 50. In one embodiment, original content management function 90 stores original content 50 in content storage 100. Content storage 100 may be a repository that may be written and read by original content management function 90.

In one embodiment, original content management function 90 is a function of content recording program 80 on subscriber system 40. In other embodiments, original content management function 90 may be a separate program that resides on another electronic device or computing system, provided that original content management function 90 is able to communicate with interrupt broadcasting program 70 and has access to content storage 100.

Figure 2:
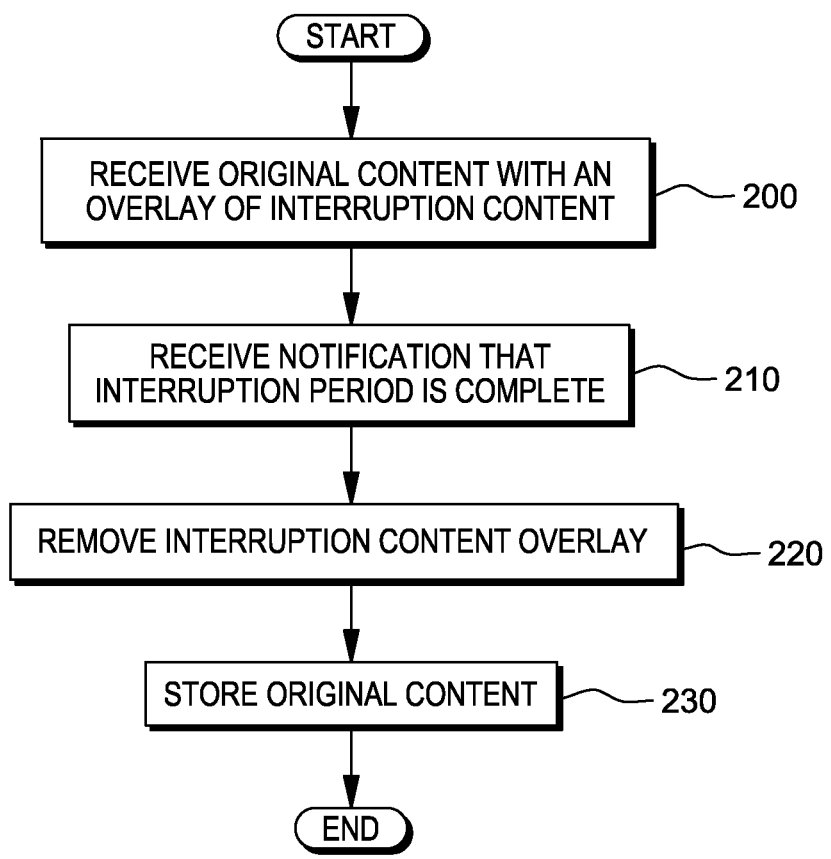
FIG. 2 depicts a flowchart of the steps of an original content management function executing within the system of FIG. 1, for accessing and storing original content, without an overlay of interruption content, which was unavailable during an interruption period, in accordance with one embodiment of the present invention.

FIG. 2 depicts a flowchart of the steps of original content management function 90 executing within the system of FIG. 1, for accessing and storing original content 50 without an overlay of interruption content 60, which was unavailable during an interruption period, in accordance with one embodiment of the present invention.

In one embodiment, initially, provider system 30 receives original content 50 and interruption content 60 from respective content producing sources (e.g., a broadcast network (NBC, CBS, etc.), TV studio, movie studio, newsroom, etc.). Interrupt broadcasting program 70 overlays original content 50 with interruption content 60 such that all of interruption content 60 would be visible to a viewer. Interrupt broadcasting program 70 sends original content 50 with an overlay of interruption content 60 to original content management function 90 during the interruption period.

In step 200, original content management function 90 receives original content 50 with an overlay of interruption content 60 from interrupt broadcasting program 70, over network 20, during an interruption period.

In step 210, original content management function 90 receives a notification from interrupt broadcasting program 70 indicating that the interruption period is complete. In one embodiment, the notification is metadata embedded at the end of interruption content 60. In another embodiment, the notification is sent to original content management function 90 from interrupt broadcasting program 70 over network 20.

In one embodiment, the notification contains a filter for removing the overlay of interruption content 60 from original content 50. A filter may be a software component such as a "coder-decoder" (codec) used to remove the overlay that was placed on original content 50 by interrupt broadcasting program 70.

In step 220, in response to receiving the notification from interrupt broadcasting program 70 indicating that the interruption period is complete, original content management function 90 accesses original content 50 without an overlay of interruption content 60. In one embodiment, original content management function 90 removes the overlay of interruption content 60 from original content 50 using the filter received in step 210.

In step 230, original content management function 90 stores original content 50 in content storage 100.

In another embodiment, initially, provider system 30 receives original content 50 and interruption content 60 from respective content producing sources (e.g., a broadcast network (NBC, CBS, etc.), TV studio, movie studio, newsroom, etc.). Interrupt broadcasting program 70 overlays original content 50 with interruption content 60 such that all of interruption content 60 would be visible to a viewer. Interrupt broadcasting program 70 also encrypts original content 50 using a known symmetric or asymmetric encryption algorithm (e.g., Advanced Encryption Standard (AES)). Interrupt broadcasting program 70 sends encrypted original content 50 and original content 50 with an overlay of interruption content 60 to original content management function 90 during the interruption period.

In another embodiment, in step 200, original content management function 90 receives encrypted original content 50 and original content 50 with an overlay of interruption content 60 during the interruption period.

In another embodiment, in step 210, original content management function 90 receives a notification from interrupt broadcasting program 70 indicating that the interruption period is complete. In one embodiment, the notification is metadata embedded at the end of interruption content 60. In another embodiment, the notification is sent to original content management function 90 from interrupt broadcasting program 70 over network 20.

In another embodiment, the notification contains a decryption key needed to decrypt encrypted original content 50 received by original content management function 90. The decryption key may be the same key used by interrupt broadcasting program 70 to encrypt original content 50 (if a symmetric encryption algorithm was used) or the decryption key may be the opposite key of an asymmetric key pair from the key used to encrypt original content 50 (if an asymmetric algorithm was used).

In another embodiment, in step 220, in response to receiving the notification from interrupt broadcasting program 70 indicating that the interruption period is complete, original content management function 90 accesses original content 50 without an overlay of interruption content 60. Original content management function 90 decrypts encrypted original content 50 using the encryption algorithm used to encrypt original content 50 and the decryption key received in step 210.

In another embodiment, in step 230, original content management function 90 stores original content 50 in content storage 100.

Figure 3:
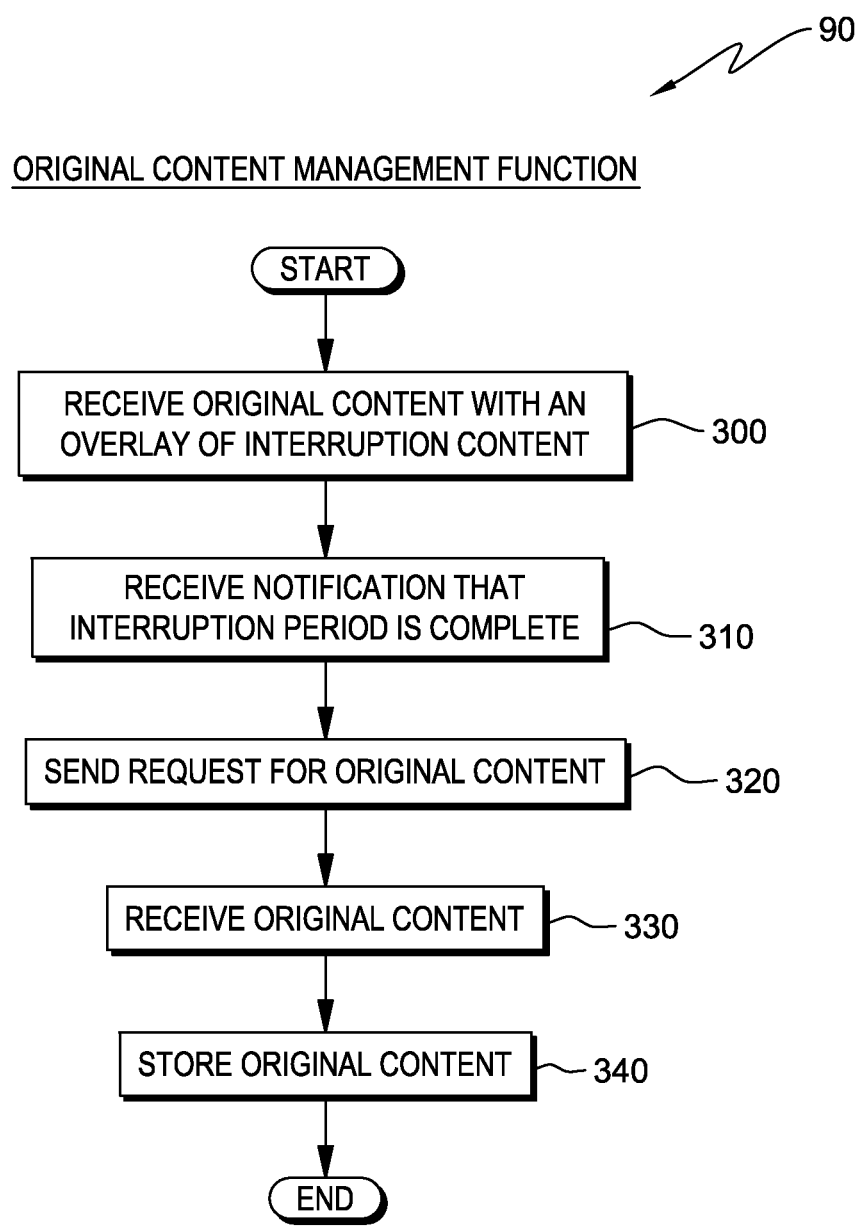
FIG. 3 depicts a flowchart of the steps of an original content management function executing within the system of FIG. 1, for accessing and storing original content, without an overlay of interruption content, which was unavailable during an interruption period, in accordance with another embodiment of the present invention.

FIG. 3 depicts a flowchart of the steps of original content management function 90 executing within the system of FIG. 1, for accessing and storing original content 50 without an overlay of interruption content 60, which was unavailable during an interruption period, in accordance with another embodiment of the present invention.

In one embodiment, initially, provider system 30 receives original content 50 and interruption content 60 from respective content producing sources (e.g., a broadcast network (NBC, CBS, etc.), TV studio, movie studio, newsroom, etc.). Interrupt broadcasting program 70 overlays original content 50 with interruption content 60 such that all of interruption content 60 would be visible to a viewer. Interrupt broadcasting program 70 sends original content 50 with an overlay of interruption content 60 to original content management function 90 during the interruption period.

In step 300, original content management function 90 receives original content 50 with an overlay of interruption content 60 from interrupt broadcasting program 70, over network 20, during an interruption period.

In step 310, original content management function 90 receives a notification from interrupt broadcasting program 70 indicating that the interruption period is complete. In one embodiment, the notification is metadata embedded at the end of interruption content 60. In another embodiment, the notification is sent to original content management function 90 from interrupt broadcasting program 70 over network 20.

In step 320, in response to receiving the notification from interrupt broadcasting program 70 indicating that the interruption period is complete, original content management function 90 accesses original content 50 without an overlay of interruption content 60. In one embodiment, original content management function 90 sends a request for original content 50 without an overlay of interruption content 60 to interrupt broadcasting program 70 over network 50.

In step 330, original content management function 90 receives original content 50 without an overlay of interruption content 60 from interrupt broadcasting program 70 over network 50.

In step 340, in response to receiving original content 50 without an overlay of interruption content 60 from interrupt broadcasting program 70, original content management function 90 stores original content 50 in content storage 100.

FIG. 4 depicts a block diagram of components of provider system 30 and subscriber system 40 in accordance with one embodiment of the present invention. It should be appreciated that FIG. 4 provides only an illustration of one implementation and does not imply any limitations with regard to the environments in which different embodiments may be implemented. Many modifications to the depicted environment may be made.

Provider system 30 and subscriber system 40 each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Original content 50, interruption content 60, and interrupt broadcasting program 70 are stored in persistent storage 408 of provider system 30 for execution and/or access by one or more of the respective computer processors 404 of provider system 30 via one or more memories of memory 406 of provider system 30. Content recording program 80, original content management function 90, and content storage 100 are stored in persistent storage 408 of subscriber system 40 for execution and/or access by one or more of the respective computer processors 404 of subscriber system 40 via one or more memories of memory 406 of subscriber system 40. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Original content 50, interruption content 60, and interrupt broadcasting program 70 may be downloaded to persistent storage 408 of provider system 30 through communications unit 410. Content recording program 80, original content management function 90, and content storage 100 may be downloaded to persistent storage 408 of subscriber system 40 through communications unit 410.

I/O interface(s) 412 allows for input and output of data with other devices that may be connected to provider system 30 or subscriber system 40. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor or a television.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for accessing and storing original content without an overlay of interruption content, the method comprising the steps of:
- a computer receiving original content with an overlay of interruption content during an interruption period from a content provider;
- the computer receiving encrypted original content without the overlay of interruption content during the interruption period from the content provider;
- the computer receiving a notification that the interruption period is complete, wherein the notification includes a decryption key to decrypt the received encrypted original content without the overlay of interruption content;
- the computer decrypting the encrypted original content without the overlay of interruption content using the decryption key; and
- the computer storing the decrypted original content without the overlay of interruption content.

2. The method of claim 1, wherein the overlay of interruption content comprises audio and video.

3. A computer program product for accessing and storing original content without an overlay of interruption content, the computer program product comprising:
- one or more computer-readable hardware storage devices and program instructions stored on the one or more computer-readable hardware storage devices, the program instructions comprising:
- program instructions to receive original content with an overlay of interruption content during an interruption period from a content provider;
- program instructions to receive encrypted original content without the overlay of interruption content during the interruption period from the content provider;
- program instructions to receive a notification that the interruption period is complete, wherein the notification includes a decryption key to decrypt the received encrypted original content without the overlay of interruption content;
- program instructions to decrypt the encrypted original content without the overlay of interruption content using the decryption key; and
- program instructions to store the decrypted original content without the overlay of interruption content.

4. The computer program product of claim 3, wherein the overlay of interruption content comprises audio and video.

5. A computer system for accessing and storing original content without an overlay of interruption content, the computer system comprising:
- one or more computer processors;
- one or more computer-readable storage media;
- program instructions stored on the computer-readable storage media for execution by at least one of the one or more processors, the program instructions comprising:
- program instructions to receive original content with an overlay of interruption content during an interruption period from a content provider;
- program instructions to receive encrypted original content without the overlay of interruption content during the interruption period from the content provider;
- program instructions to receive a notification that the interruption period is complete, wherein the notification includes a decryption key to decrypt the received encrypted original content without the overlay of interruption content;
- program instructions to decrypt the encrypted original content without the overlay of interruption content using the decryption key; and
- program instructions to store the decrypted original content without the overlay of interruption content.

6. The computer system of claim 5, wherein the overlay of interruption content comprises audio and video.

\* \* \* \* \*